Patented Mar. 8, 1927.

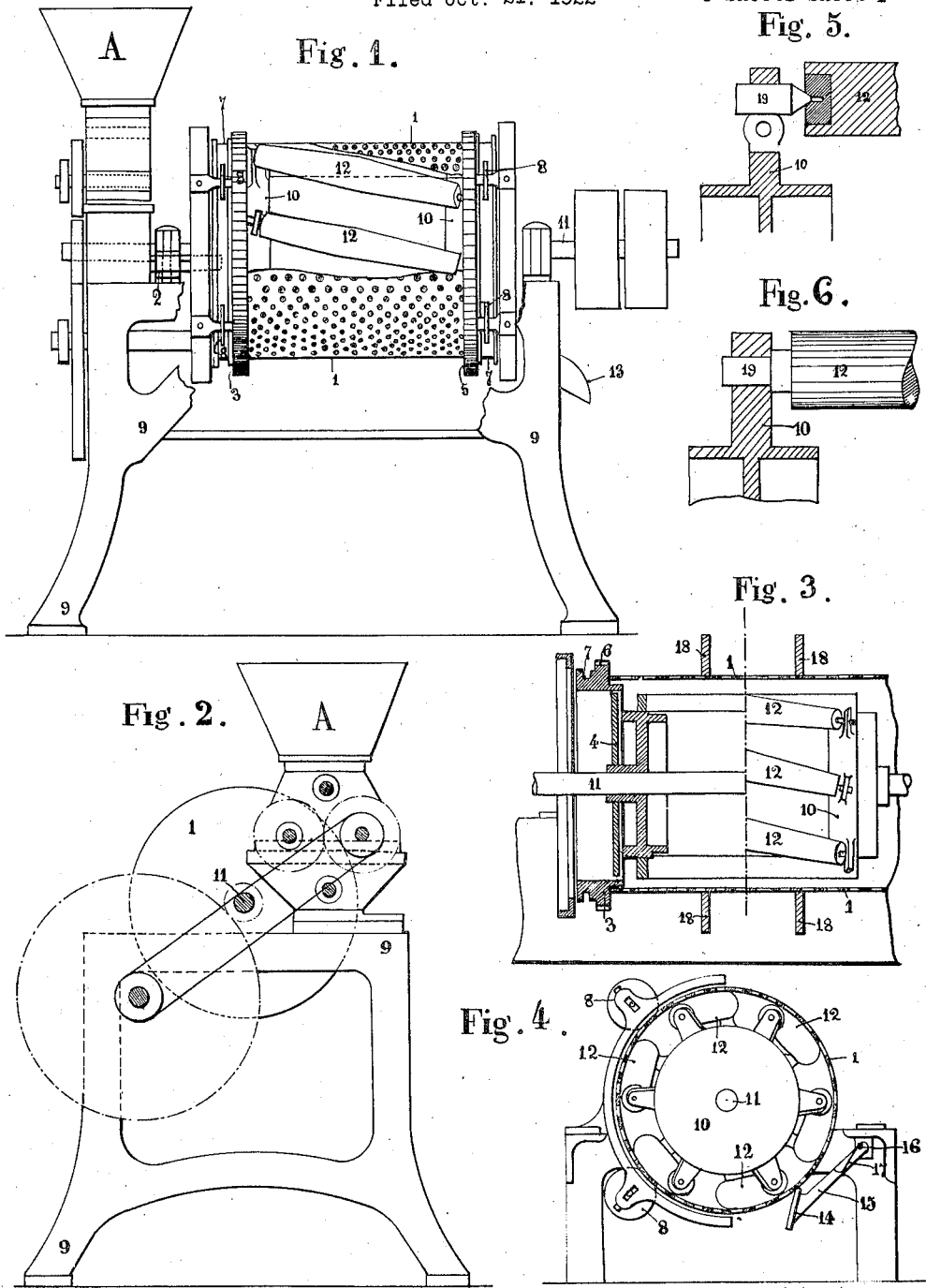
March 8, 1927.
P. NAVARRE
1,620,567
APPARATUS FOR CONTINUOUS EXTRACTION BY PRESSURE
Filed Oct. 21, 1922  3 Sheets-Sheet 1

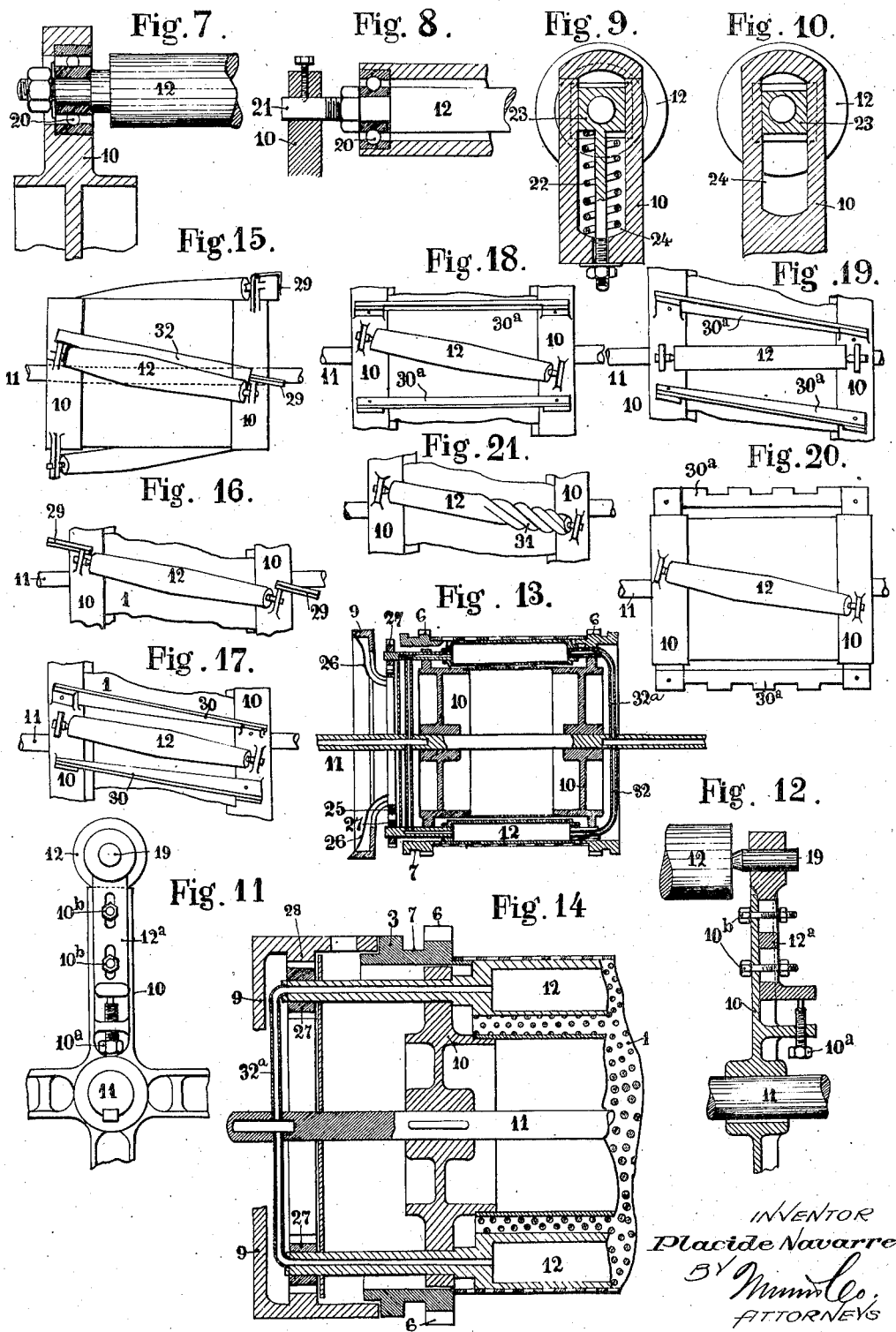

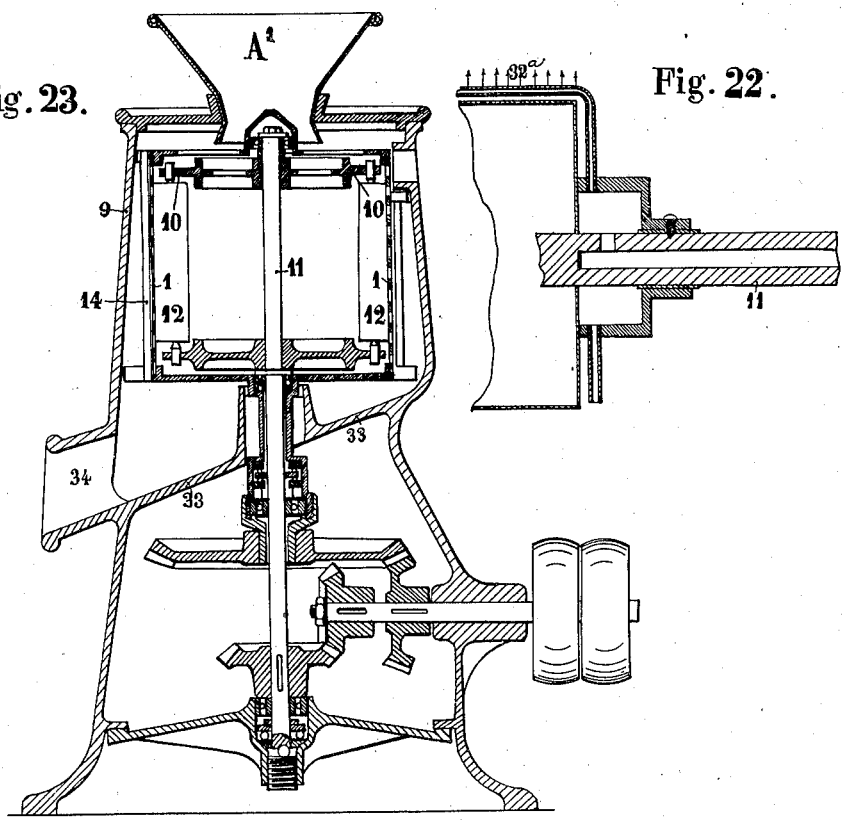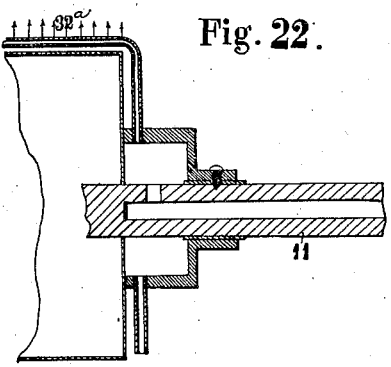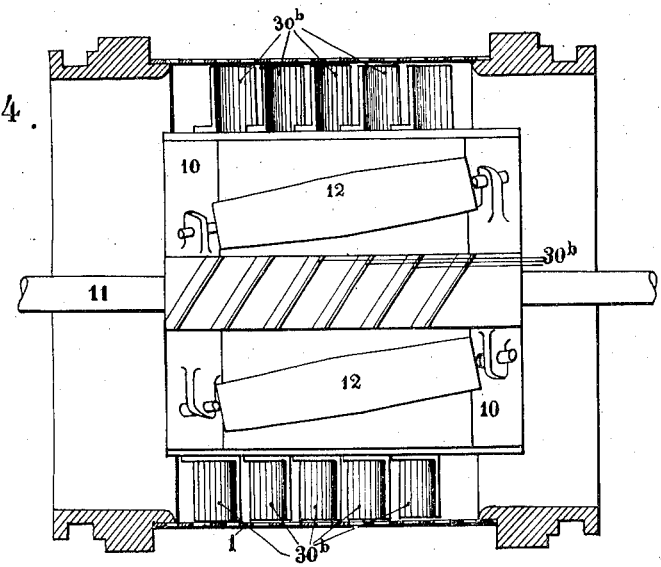

1,620,567

UNITED STATES PATENT OFFICE.

PLACIDE NAVARRE, OF PARIS, FRANCE, ASSIGNOR TO SOCIÉTÉ FRAISSE FRERES, OF CAVAILLON, FRANCE, AND SOCIÉTÉ P. NAVARRE ET FILS, OF PARIS, FRANCE.

APPARATUS FOR CONTINUOUS EXTRACTION BY PRESSURE.

Application filed October 21, 1922, Serial No. 596,092, and in France May 26, 1922.

There exist machines called "mechanical screens or strainers", which are utilized for separating from products or from fruits of any kind of the one part the cortical or corticose matter, the cores, pips or seeds and in general all that which has to be removed from the pasty, pulpy or juicy matter of the other part.

These machines are constituted by helical wings fixed upon a central shaft rotating in the interior of a fixed or rotating cylinder and perforated either wholly or partly.

By reason of the fact that the extraction is obtained by continuous friction it is indispensable for a good out put to give rather great speeds to the helical wings so that with products which are very thick and difficult to separate a heating is produced which is often prejudicial to the matter being treated when some of the constitutive elements are, for example, changed or deteriorated wholly or partly when they attain or surpass a certain temperature.

Due to this continuous friction certain of the parts to be removed are more or less disintegrated so that the screened product contains substances which should have been removed.

Finally, these machines, which absorb a relatively high amount of power, cannot be employed either for filtration or for pressure so that their industrial work is strictly limited to separation.

The present invention has for its object an extraction apparatus acting by continuous pressure, which may be variable and may be regulated, thus permitting the inconveniences above indicated to be avoided; the said apparatus realizing mechanically and in an automatic manner the separation of the matter to be extracted from the mass in which it is found, whether the said matter be liquid or pasty, comprising all the intermediate stages of whatever consistency.

The pressure extraction apparatus forming the object of the present invention is essentially characterized by the combination:

(a) of a cylindrical drum, horizontally or vertically fixed or rotating, perforated upon the whole or part of its surface and in the interior of which the matter to be treated is injected by any appropriate means;

(b) of rollers carried by a rotating support lodged in the interior of the drum, having a screening or filtering wall, these rollers either mounted loosely or driven in their support being adapted to press the products in a continuous manner which is variable and adapted to be regulated upon the said screening or filtering wall and being inclined or not with respect to the generators of the drum or combined with inclined plates in such a manner as to produce the movement of the materials to be treated from the entrance towards the exit of the drum.

In order that the invention may be clearly understood, there will be described hereafter, by way of example, with respect to the annexed drawings, various methods of constructing the apparatus for continuous extraction by pressure, forming the object of the present invention.

Figures 1 and 2 are respectively a front elevation partly cut away and an end view of a horizontal apparatus;

Figures 3 and 4 are partial views of a second form of carrying the invention into effect;

Figures 5 to 12 are detail views showing different methods of mounting the pressure rollers;

Figures 13 and 14 are two partial vertical longitudinal sections made according to the axis of the perforated drum of apparatus in which the pressure rollers are driven mechanically and are traversed in their interior by a circulation of liquid or gaseous fluid.

Figures 15 to 20 are detail views representing rollers combined with wings fixed to the rotating support carrying the rollers;

Figure 21 is a modification of the roller;

Figure 22 shows a modification for the distribution of a fluid between the rollers and the driving wings;

Figure 23 a vertical longitudinal section of an apparatus for extraction by pressure having a vertical drum;

Figure 24 is a modification.

In the method of carrying the invention into effect shown in Figures 1 and 2 apparatus forming the present invention is provided with a receiving and distributing apparatus indicated diagrammatically at A and which producing or not a preliminary crushing or pounding of the materials to be treated, is adapted to facilitate the work of the machine and to assure its regular feeding.

This apparatus is evidently variable according to the products to be treated and is only an accessory, the apparatus forming the present invention being capable, it will be understood, of being, in certain cases, fed by hand.

This apparatus, represented in the different figures of the drawing, comprises essentially a rotary cylindrical drum 1, receiving, in the example represented, the products to be treated from the distributor A by a conduit 2 opening into the interior of a ring 3 close to a fixed disc 4 arranged in the said ring (Figs. 1 and 3). This disc 4 forms one of the ends of the drum 1, which is constituted by a perforated screening or filtering metal sheet, the perforations of which may be uniform or progressively smaller from the entrance to the exit. This sheet may equally well be replaced by metallic gauze or a filtering fabric of convenient composition, which, in this case, is enclosed on its exterior by a resisting sheet having larger perforations or by any suitable metallic support, the object of which is to maintain the filtering or screening part and to permit it to resist the pressure.

The ends of this screening or filtering cylinder are mounted upon rings 3 and 5 having at one part teeth 6 which permit of them thus transmitting rotary movement to the screening or filtering wall 1 to which they are fixed and having at another part a guiding groove 7 in which are engaged rolling and centering rollers 8 mounted upon a fixed frame 9.

These methods of rotation and guiding of the cylinder 1 are only given by way of example and may be respectively obtained by any other mechanical means and by another method of mounting.

In the interior of the rotating cylinder 1, two cheeks 10, arranged parallel to one another, are mounted upon a central shaft 11 and carry rollers 12 of wood, metal, covered with rubber or not, or of any other composition according to the nature of the product to be treated and the result to be obtained. The two cheeks 10 may be connected one to the other by a drum or replaced by cross bars or radial arms connected in a rigid manner to the shaft 11. The rollers 12 have, with respect to the generators of the cylinder 1, such a profile that they may be in contact with the interior of the said cylinder or more or less removed from this latter this spacing being constant or diminishing from the inlet towards the outlet.

The longitudinal axis of these rollers 12, which have for their object to press the products upon the screening or filtering part, makes a certain angle with the generators of the drum 1 so as thus to form a screw and cause the movement of the materials from the entrance towards the outlet of the said cylinder 1.

These materials are more and more exhausted according to their advancement in the cylinder and to a degree corresponding to the regulation adopted, the parts to be recovered by screening, pressure or filtration are expressed through the cylinder 1, the others eliminated towards the outlet and thrown out through a conduit 13. The rollers may be mounted loosely in the supports 10, the adherence by pressure of the materials upon the drum 1 sufficing to turn them; they may equally be driven mechanically and turned in the direction of their travel or in an inverse direction.

The complete set of the rollers 12 is driven by the shaft 11 at a different speed to that of the cylinder in the case of rotation in the same direction; these two parts being capable further of receiving movements in the same direction or in the contrary direction, according to the result which it is desired to obtain. Likewise, the cylinder 1 may be fixed and in this case perforated wholly or partly in emergency in its lower part.

When the products to be extracted through the cylinder 1 are sufficiently clear, they fall by gravity into a receiver arranged for this purpose and not represented in the drawing. The drum 1 may be surrounded by a fixed protecting envelope having no projections, maintained at a convenient distance from the said drum and of a suitable form to conduct the products into the receiver adapted to receive them.

When these products are thick or pasty there may be arranged with advantage, as shown in Fig. 4, at the exterior of the cylinder 1, a scraper 14 stretched across the whole length of the said cylinder or divided into sections in the particular case where the products ought to be divided into products of first pressure, second pressure and so on, as will be hereinafter explained. This scraper in one or several parts may be mounted upon arms 15 hinged around the axle 16 and held applied upon the exterior surface of the drum 1 by tension or compression springs 17, conveniently arranged.

When the products extracted through the cylinder 1 ought to be submitted to one or more supplementary operations of mechanical, physical or chemical order, separated or combined, one may imagine upon the same machine the adaptation of mechanism and of supplementary apparatus realizing the result to be obtained. One can conceive, for example, that the receiver adapted to receive these products is replaced by a stirrer, a mechanical kneading trough, a mixer, to which there may be added other elements such as a cooking or heating apparatus, etc., the arrival of the products at the complementary mechanism being made mechanically or by gravity.

One may also conceive, in case of addition of a foreign element to the screened, filtered or pressed product, an appropriate distributor which regulates the addition of this element in the desired proportion and works in synchronism with the output of the machine. The general principle of working being thus set out, it may be admitted that in the treatment of certain products there would be an advantage in obtaining the separations in the order of quality of the screened, pressed or filtered materials as actually takes place in extracting oil from fatty bodies, in the juice of grapes, apples or other fruits. As this classification may be advantageous or necessary for other products, it is advantageous from a commercial point of view to obtain the same classifications with the apparatus forming the subject of the present invention, which is provided for this purpose with fixed or movable separations adapted to be regulated with respect to their distance apart or not and which, for example, may be constituted as shown in Fig. 3 by imperforate discs 18 surrounding the drum 1 and fixed upon it in a manner to turn with this latter or even fixed; these discs in convenient number permitting the separation of the different qualities obtained and which will be determined on one part by the regulating of the machine and on the other part by the relative position of the separation disc or discs 18.

The pressure rollers 12 may be as has been above stated either loose or driven.

In the first case these rollers may be mounted between pivot points 19 as shown in Figs. 5, 11 and 12, or upon a plain bearing part 19 as in Fig. 6 or upon ball bearings 20 as in Figs. 7 and 8; this mounting upon ball bearings may, for example, comprise an axle 21 fixed rigidly in the parallel cheeks or in the radial arms 10 as shown in Fig. 8. It is further evident that these methods of mounting are only given by way of example; Figs. 11 and 12 show a mounting permitting the distance apart of the rollers 12 to be regulated and to vary consequently the value of the pressure exerted by these latter; the said rollers being, for example, carried by slides 12ª, the position of which upon the cheeks or arms 10 may be regulated by pressure screws 10ª and fixed by bolts 10ᵇ.

It will be admitted equally and principally in the case of loose rollers that the pressure which they ought to exercise instead of being regulated in a rigid manner ought to be effected automatically by means of tension springs 22 which are capable of being adjusted, as represented in Fig. 9; these springs acting upon roller carrying bearings 23, which slide in mortises 24 formed in the radial arms or in the cheeks 10.

Finally, the pressure to be exercised by the rollers may be regulated by varying the speed of rotation of the radial arms 10, that is to say, of the shaft 11 and the weight of the rollers 12. For certain products, very thick or sticky, the friction which ought to drive the rollers may not be sufficient. It may be necessary to assure their rotation by suitable mechanical means, toothed wheels, for example. Fig. 13 shows an arrangement in which the rollers 12 rotate in the same direction as the shaft 11 and which comprises: a toothed wheel 25, centered around the shaft 11 but held fixed by brackets 26 fixed or connected rigidly to the fixed frame 9, pinions 27 connected rigidly to the rollers 12 driven by the shaft 11, the said pinions 27 gearing with the toothed wheel 25 and assuring the rotation of the rollers 12 in the same direction as the shaft 11.

Fig. 14 represents another arrangement in which the rollers 12 turn in the contrary sense to that of the shaft 11. In this case an interiorly toothed ring 28 is fixed upon the fixed frame 9 and concentrically to the shaft 11; or in some cases to the ring 3 fixed rigidly with respect to the drum 1. The pinions 27 fixed upon the rollers 12 gear with the ring 28 and cause these rollers to rotate in the contrary direction to the shaft 11.

It is evident that these driving arrangements may vary in the form adopted and that they may be provided at each end of the rollers.

It is naturally necessary by reason of the helical arrangement of the rollers to give to the respective sets of teeth convenient inclinations.

The relation of the numbers of teeth is evidently variable and so determined as to produce either the circumferential speeds of the rollers equal to the surface speed in the interior of the cylinder 1, or different speeds combining this the pressure with a differential movement upon the materials being treated, which may have an advantage in certain cases.

It may also be necessary to combine the rollers 12 with helical wings according to the nature of the products to be treated and the result to be obtained. These helical wings which may be either of wood or metal covered with rubber or not or of any composition, may also be constituted by metallic or other brushes.

Figure 15 shows the rollers 12 carrying on one side only, inlet or outlet, a helical wing element. This element 29, when it is placed towards the entry, has for its object to facilitate the taking of the products by the rollers 12 and when it is placed towards the outlet it facilitates the evacuation of the parts to be removed and may also be employed to give to these products a supplementary exhaustion.

Figure 16 shows the rollers 12 combined with the helical wing elements 29, one at the entry, the other at the outlet.

Figure 17 shows the combination of rollers 12 with helical wings 30 interposed between them. When treating very thick products, difficult to move forward, the rollers accomplish their work of pressure and the helical wings 30 assist in the advancement.

Figures 18 to 20 are modifications. In Figure 18 the rollers 12 effect their work of pressure and the forwarding of the products; the little wings 30ª are parallel to the generators of the cylinder 1 and act as scrapers of the internal surface of the said cylinder. However, in Fig. 20 these little wings having the same arrangement are toothed and only work on parts of their length, the useful parts being inserted. This arrangement, which has for its object to divide further the material, may be applied to the construction represented in Figs. 17, 18 and 19.

In Fig. 21, rollers 12 carry upon the whole or part of their length, helical grooves 31, having suitable profile, pitch and direction adapted to aid in moving the products forward.

In the method of carrying into effect represented in Fig. 24, paddles 30ᵇ are interposed in a convenient number between the rollers 12 and are, like these latter, fixed with relation to the radial arms or cheeks 10, so that they may be driven in the rotary movement of the shaft 11.

The form and inclination of these paddles are variable according to the materials to be treated and have for their object, in the case where the said materials are moved with difficulty, to move them by successive pressure by dividing them.

When materials which have not great consistency are being treated, the rollers 12 do not get dirty; when working compact materials there is not the same action. In order to avoid the inconvenience which results from this soiling there have been provided, as shown in Fig. 15, narrow scrapers 32, which, fixed rigidly to the cheeks 10 or radial arms replacing them, are suitably adjusted and arranged to remove in a continuous manner from the rollers 12 all portions which would adhere thereto.

In Figs. 13 and 14 the shaft 11, hollow throughout the whole or part of its length, is connected to a series of radial tubes 32ª, which can either distribute lubricant within the bearings of the rollers 12 or distribute in the interior of the said rollers, which are supposed to be hollow in these circumstances, any liquid or any fluid, hot or cold, according to the object desired.

In the extraction of oil from certain fatty bodies, for example, it is sometimes advantageous to work at a certain temperature in order to increase the fluidity of the oil and to facilitate the exhaustion of the materials treated. In this case it is possible to effect by the above means a circulation either of steam, hot water or hot air in the interior of the rollers with the inlet at one side of the machine and the outlet at the other side.

It is also possible to obtain by the same means an inflation of hot or cold air, hot or cold water, steam or other gaseous fluid in the interior of the cylinder 1 through the fixed disc 4.

The arrangement indicated in Fig. 22 also permits of obtaining a distribution of any fluid in the body of the materials under treatment by perforated tubes 32ª inserted between the rollers 12 or the helical wings.

It will be understood that the arrangements above described may be employed separately or combined in any appropriate manner with the particular arrangement of continuous pressure by rollers either loose or driven and arranged upon a rotating support; these various arrangements permitting either a horizontal apparatus to be obtained like that described or a vertical apparatus like that represented in Fig. 23.

In this last case the apparatus comprises: a hopper, A¹, which may also be an automatic distributor having an appropriate form and mechanism, to introduce the products to the interior of the perforated cylinder 1.

The cheeks 10 consist of radial arms, at least in the upper part, to enable the products being treated to descend in the cylinder 1, which may rotate around the shaft 11 in the same direction or in the contrary direction to the rollers 12, the relative speeds being determined according to necessity.

The driving parts of the cylinder 1 and of the cheeks 10 carrying the rollers 12 may be those represented or any others, the cylinder 1 having at its upper part convenient openings to allow a passage for the products to be removed through the conduit 13.

The products screened pressed or filter pressed are conducted by the inclined lower part 33 of the exterior frame 9, of circular section at its upper part, towards conduit 34. The cylinder 1 may also be fixed.

Scrapers 14 may be provided as in the horizontal arrangements.

In the vertical arrangement the products fall by gravity to the bottom of the cylinder 1, are projected towards the perforated or filtering part, in consequence of the rotation and are taken by the rollers 12, which effect their work of pressure. Due to the helical arrangement of these rollers and in some cases of the wings (as described in the horizontal arrangement) the products are raised towards the upper part as they are exhausted, those parts which cannot pass through the cylinder 1 being thrown out through the conduit 13.

The vertical arrangement above described permits moreover of combining the continuous pressure of the rollers 12 with the action of centrifugal force and to thus obtain a more efficacious extraction.

The frame 9 is indicated with a bottom inclined towards the conduit 34, but this bottom may be perpendicular to the vertical axis and scraped by rigid or flexible arms driven by the shaft 11 or the cylinder 1 and arranged in such a manner as to force the products out through the orifice 34.

Whatever may be the form adopted of carrying the invention into effect, the apparatus forming the object of the present invention may be applied, by way of example:

1. To the filter pressure of various products by employing screening or filtering cloths of a suitable kind.
2. To the extraction of the juice of grapes, apples or various fruits.
3. To the extraction of fatty bodies in suspension in various products containing these fatty bodies.
4. To the extraction of pulpy or pasty materials contained in various fruits, seeds, grain and cereals; these products according to their nature and the result to be obtained being treated in their natural state or being submitted beforehand to one or more operations or transformations resulting from mechanical, physical or chemical treatment, separated or combined and, for example, crushing, kneading, complete or partial cooking, hot or cold maceration and the like and in each case with or without the addition of foreign bodies, previous separation or not, of a part of their constitutive elements.

The above enumerations of the possible applications as well as the operations, transformations or additions which the products to be treated may be submitted to, either before their passage or during their passage in the machine are only indicative and not restrictive, the apparatus described being capable of working as a screen, presser, filter press or press, in an automatic and continuous manner with the possibility of adjusting the pressure and the degree of exhaustion of the part of the products rejected by the perforated screening or filtering part; the said apparatus permitting equally the screen pressed or filter pressed products to be divided, pressed or filter pressed into different categories according to their market values, these different categories corresponding to the products produced by the first, second or subsequent pressure obtained already with other processes.

When the products to be treated contain only, besides the substances to be extracted, skins, stalks, coverings, tails, pips, little cores and generally foreign bodies of small dimensions, hard or not, it is possible to pass them directly into the apparatus forming the subject of the present invention. If, on the contrary, in addition to the substances to be extracted there are in suspension hard bodies of large dimensions it is advisable to remove these latter previously.

The constructive elements above described are only given by way of example, the forms, materials and dimensions of the various constitutive parts may be modified without changing the invention.

Claims:—

1. A continuous apparatus for extracting by a continuous, variable and adjustable pressure, comprising: a rotary cylindrical drum with a perforated wall, within which is discharged the material to be treated,—a support mounted in the rotary drum and receiving a rotary movement in the latter,—pressure rollers loosely mounted in the rotary support and in contact with the material to be treated, the said rollers forming a certain angle with the generatrices of the perforated drum and helical grooves formed on the said rollers for assisting the displacement of the products.

2. A continuous apparatus for extracting by a continuous, variable and adjustable pressure, comprising a rotary cylindrical drum with a perforated wall, within which is discharged the material to be treated, a support mounted in the rotary drum and receiving a rotary movement in the latter, pressure rollers loosely mounted in the rotary support, blades secured on the said support, said rollers and blades being in contact with the material to be treated and the said rollers forming a certain angle with the generatrices of the perforated drum, and helical grooves formed on the said rollers for assisting the displacement of the products.

3. A continuous apparatus for extracting by a continuous, variable and adjustable pressure, comprising a rotary cylindrical drum with a perforated wall, within which is discharged the material to be treated, a support arranged within the said drum, rollers carried by the said support, means for imparting a rotary movement to the support and to the rollers carried by the same, means for maintaining these rollers in contact with the material to be treated, delivered in the perforated rotary drum, means for insuring the displacement of the products to be treated within the said drum and from one end to the other of the latter, a hollow shaft carrying the support and connected to a source of fluid supply for controlling the temperature of the drum.

4. A continuous apparatus for extracting by a continuous, variable and adjustable pressure, comprising a rotary cylindrical drum with a perforated wall, within which is discharged the materal to be treated, a support mounted in the rotary drum and receiving a rotary movement in the latter, pressure rollers loosely mounted in the rotary support and in contact with the material to be treated, blades with a smooth edge secured on the rotary support in an inclined position relative to the pressure rollers for insuring the displacement of the material through the rotary drum, a hollow shaft carrying the support and connected to a source of fluid supply for controlling the temperature of the drum.

The foregoing specification of my apparatus for continuous extraction by pressure, signed by me this 4th day of October, 1922.

PLACIDE NAVARRE.